United States Patent

Takahashi et al.

(10) Patent No.: US 10,341,248 B2
(45) Date of Patent: Jul. 2, 2019

(54) EVALUATION DEVICE, EVALUATION METHOD AND RECORDING MEDIUM

(71) Applicants: NIPPON TELEGRAPH AND TELEPHONE CORPORATION, Chiyoda-ku (JP); OSAKA UNIVERSITY, Suita-shi (JP)

(72) Inventors: Yousuke Takahashi, Musashino (JP); Keisuke Ishibashi, Musashino (JP); Noriaki Kamiyama, Musashino (JP); Kohei Shiomoto, Musashino (JP); Yuichi Ohsita, Suita (JP); Masayuki Murata, Suita (JP)

(73) Assignees: NIPPON TELEGRAPH AND TELEPHONE CORPORATION, Chiyoda-ku (JP); OSAKA UNIVERSITY, Suita-shi (JP)

( * ) Notice: Subject to any disclaimer, the term of this patent is extended or adjusted under 35 U.S.C. 154(b) by 35 days.

(21) Appl. No.: 15/540,439

(22) PCT Filed: Jan. 26, 2016

(86) PCT No.: PCT/JP2016/052147
§ 371 (c)(1),
(2) Date: Jun. 28, 2017

(87) PCT Pub. No.: WO2016/125630
PCT Pub. Date: Aug. 11, 2016

(65) Prior Publication Data
US 2017/0373983 A1 Dec. 28, 2017

(30) Foreign Application Priority Data
Feb. 2, 2015 (JP) .................................. 2015-018659

(51) Int. Cl.
*H04L 29/06* (2006.01)
*H04L 12/805* (2013.01)
(Continued)

(52) U.S. Cl.
CPC ............ *H04L 47/36* (2013.01); *H04L 43/026* (2013.01); *H04L 43/0876* (2013.01); *H04L 49/253* (2013.01); *H04M 11/00* (2013.01)

(58) Field of Classification Search
None
See application file for complete search history.

(56) References Cited

U.S. PATENT DOCUMENTS

| 6,012,051 A * | 1/2000 | Sammon, Jr. .......... G06Q 30/02 705/26.2 |
| 2008/0219176 A1* | 9/2008 | Yamada ................... H04L 47/10 370/252 |

(Continued)

OTHER PUBLICATIONS

Yousuke Takahashi, et al., "A Generating Method of Macroflow for Flow-based Routing," IEICE Technical Report, vol. 113, No. 443, Feb. 20, 2014, pp. 31-36 (with English abstract).

(Continued)

*Primary Examiner* — Gregory B Sefcheck
*Assistant Examiner* — Jenkey Van
(74) *Attorney, Agent, or Firm* — Oblon, McClelland, Maier & Neustadt, L.L.P.

(57) ABSTRACT

An evaluation device includes a first evaluator configured, for each record used for transmission control of data circulating in a network, to evaluate extent of variation of an amount of the data, based on a history of the amounts of the data matching a condition of the record; a second evaluator configured, for each of the records, to evaluate a size of a space represented by the record, based on the condition of the record; and a calculator configured, for each of the records, to calculate an index value representing a possibil- (Continued)

ity that a predetermined or a greater amount of the data matches the condition of the record within a fixed period of time, based on an evaluation result by the first evaluator, and an evaluation result by the second evaluator. Therefore, it is possible to evaluate a possibility of a sudden occurrence of a flow whose traffic volume is large.

7 Claims, 5 Drawing Sheets

(51) Int. Cl.
  *H04M 11/00* (2006.01)
  *H04L 12/937* (2013.01)
  *H04L 12/26* (2006.01)

(56) References Cited

U.S. PATENT DOCUMENTS

| | | | | |
|---|---|---|---|---|
| 2010/0027432 | A1* | 2/2010 | Gopalan | H04L 41/142 370/252 |
| 2010/0257580 | A1* | 10/2010 | Zhao | H04L 43/00 726/1 |
| 2012/0173710 | A1* | 7/2012 | Rodriguez | H04L 43/026 709/224 |
| 2013/0117847 | A1* | 5/2013 | Friedman | H04L 63/102 726/22 |
| 2014/0325649 | A1* | 10/2014 | Zhang | H04L 43/024 726/23 |

OTHER PUBLICATIONS

Hiroyuki Kudou, et al., "Effectiveness of routing granularity selection schemes for OpenFlow networks," IEICE Technical Report, vol. 111, No. 8, Apr. 14, 2011, (10 pages) (with English abstract).

Hiroaki Yamanaka, et al., "A Consideration of Flow Translation Enabling Arbitrary Flow Definition in Flow Space Virtualization," IEICE Technical Report, vol. 112, No. 352, Dec. 6, 2012, (7 pages) (with English abstract).

Anukool Lakhina, et al., "Diagnosing Network-Wide Traffic Anomalies," ACM SIGCOMM, Aug. 30-Sep. 3, 2004, (12 pages).

International Search Report dated Apr. 19, 2016 in PCT/JP2016/052147 filed Jan. 26, 2016.

* cited by examiner

| TIME | SOURCE IP ADDRESS | DESTINATION IP ADDRESS | SOURCE PORT NUMBER | DESTINATION PORT NUMBER | PROTOCOL NUMBER | FLOW COUNTER VALUE |
|---|---|---|---|---|---|---|
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋯ | ⋯ | ⋯ | ⋯ | ⋯ | ⋯ | ⋯ |

17

EVALUATION DEVICE, EVALUATION METHOD AND RECORDING MEDIUM

TECHNICAL FIELD

The present invention relates to an evaluation device, an evaluation method, and a recording medium.

BACKGROUND ART

In recent years, attention to the SDN (Software-Defined Network) technology represented by OpenFlow has been increasing as a new traffic control technology. The advent of the SDN technology enables routing by units of microflows, which has been difficult with conventional networking technologies. In addition, flow measurement technologies such as NetFlow are spreading, which makes it easy to grasp detailed traffic information (flow data) by units of micro flows.

In OpenFlow, a flow is controlled by using a flow entry on an OpenFlow switch. The flow entry includes a flow identification field and an action field. The flow identification field represents conditions for a flow (for example, a packet) in terms of source and destination IP addresses, source and destination port numbers, protocol number, and the like. The action field represents a method of processing the flow that matches the conditions, such as outputting to a specific port, dropping the flow, and the like.

A flow entry that includes a wildcard in the conditions enables controlling multiple flows by the single entry. By using the flow entry including a wildcard, a flow whose traffic volume is large can be controlled by a small number of flow entries.

On the other hand, a sudden occurrence of a flow whose traffic volume is large (a spike flow) is often observed on the Internet. If such a spike flow concentrates on a specific link, congestion may occur in the link, and consequently, the performance of the entire network may drop.

To cope with a spike flow, individual control such as traffic shaping and detour control may be performed so as to prevent a performance drop of the entire network.

PRIOR ART DOCUMENTS

Non-Patent Documents

Non-patent document 1: A. Lakhina, M. Crovella, and C. Diot, "Diagnosing Network-Wide Traffic Anomalies", in ACM SIGCOMM, Portland, August 2004.

SUMMARY OF INVENTION

Problem to be Solved by the Invention

If a cause of a spike flow can be identified, individual control as described above may be applied based on the source and destination IP addresses and the source and destination port numbers of the spike flow; however, it has become increasingly difficult to identify causes due to diversification of applications and network terminals.

In view of the above, the present invention has an object to make it possible to evaluate a possibility of a sudden occurrence of a flow whose traffic volume is large.

Means for Solving the Problem

To solve the above problem, an evaluation device includes a first evaluator configured, for each record used for transmission control of data circulating in a network, to evaluate extent of variation of an amount of the data, based on a history of the amounts of the data matching a condition of the record; a second evaluator configured, for each of the records, to evaluate a size of a space represented by the record, based on the condition of the record; and a calculator configured, for each of the records, to calculate an index value representing a possibility that a predetermined or a greater amount of the data matches the condition of the record within a fixed period of time, based on an evaluation result by the first evaluator, and an evaluation result by the second evaluator.

Advantage of the Invention

It is possible to evaluate a possibility of a sudden occurrence of a flow whose traffic volume is large.

EMBODIMENTS OF THE INVENTION

Figure 1:
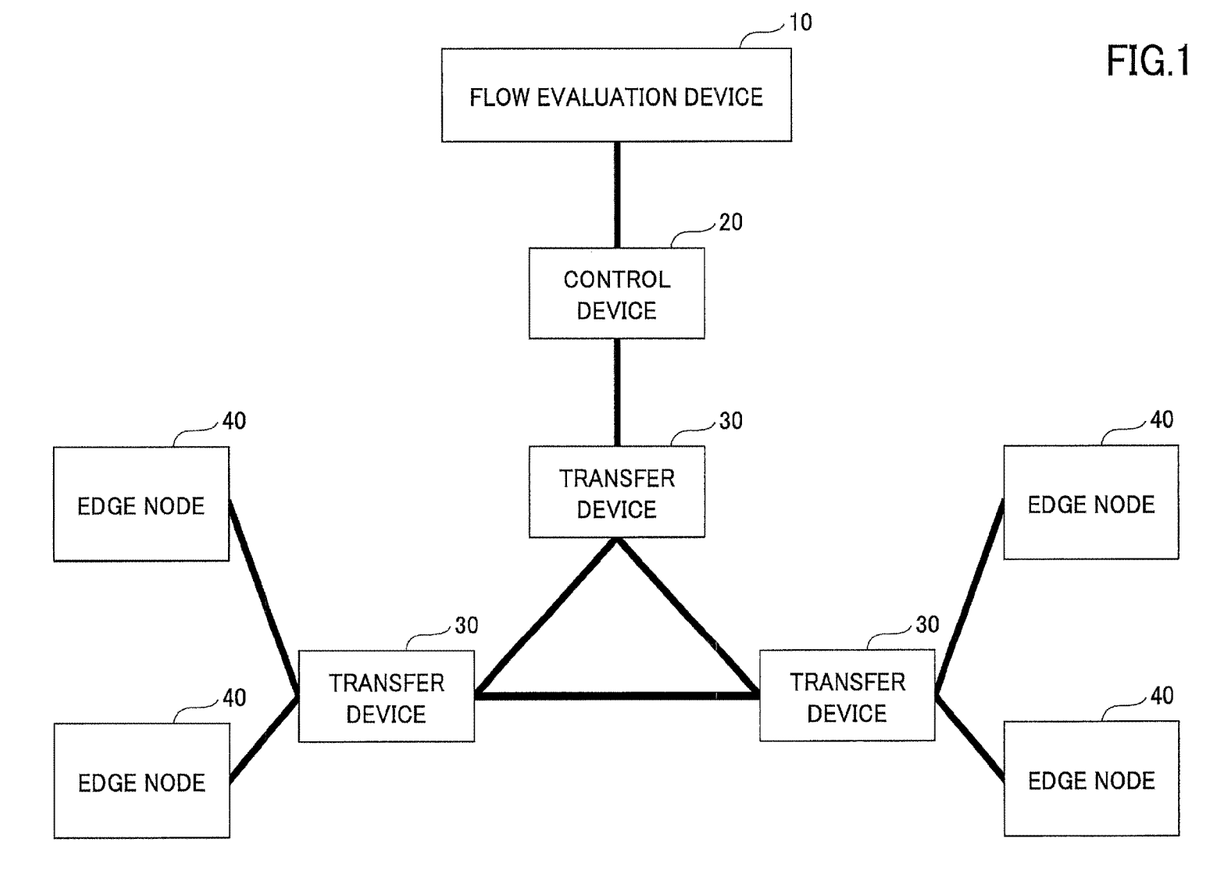
FIG. 1 is a diagram illustrating an example of a network configuration in an embodiment of the present invention.

In the following, embodiments of the present invention will be described with reference to the drawings. FIG. 1 is a diagram illustrating an example of a network configuration in an embodiment of the present invention. FIG. 1 illustrates four edge nodes 40, three transfer devices 30, one control device 20, and one flow evaluation device 10.

Each edge node 40 is a device to generate traffic of packets. In other words, each edge node 40 corresponds to the source or destination of a packet. Each edge node 40 is connected to one of the transfer devices 30 via the network.

Each transfer device 30 is a switch (an OpenFlow switch) compliant with SDN (Software Defined Network)/OpenFlow. Each transfer device 30 is connected to one of the edge nodes 40 and the other transfer devices 30 via the network. Each transfer device 30 controls the flow of a packet between the edge nodes 40 according to a flow table, which is a collection of flow entries. The flow entry is information used for transmission control of data circulating in the network, and includes a flow identifier, an action, and a flow counter. The flow identifier represents conditions for the flow (for example, a packet). The action represents a method of processing the flow (for example, data of a packet or the like) that matches the conditions. The flow counter represents statistical information, for example, the number of packets and the number of bytes that have matched the conditions of the flow entry and have been transferred. Note that in the embodiment, such number of packets or such number of bytes is referred to as the "amount of traffic".

The control device 20 is a controller (an OpenFlow controller) compliant with SDN/OpenFlow. The control device 20 sets a flow table in each transfer device 30. Also, the control device 20 accesses each transfer device 30 periodically, to obtain the flow identifier and the flow counter value of each flow entry in each transfer device 30. Note that the connection form of the control device 20 and the transfer devices 30 is not limited to a predetermined one.

The flow evaluation device 10 is a computer that obtains the flow identifier and the flow counter value of each flow entry in the flow table of each transfer device 30 from the control device 20, to calculate a spike index based on the obtained flow identifier and flow counter value. The spike index is an index to represent a possibility that a flow whose traffic volume is large (referred to as a "spike flow", below) is suddenly matched (matched with the conditions of the flow entry). In other words, the spike index is an index value to represent a possibility that a predetermined number or a greater number of flows are matched within a certain period of time. By evaluating the spike index of each flow entry in advance, it is possible to apply individual control to a flow entry having a high spike index, so as to prevent a performance drop of the entire network. The flow evaluation device 10 is connected to the control device 20 via the network.

Figure 2:
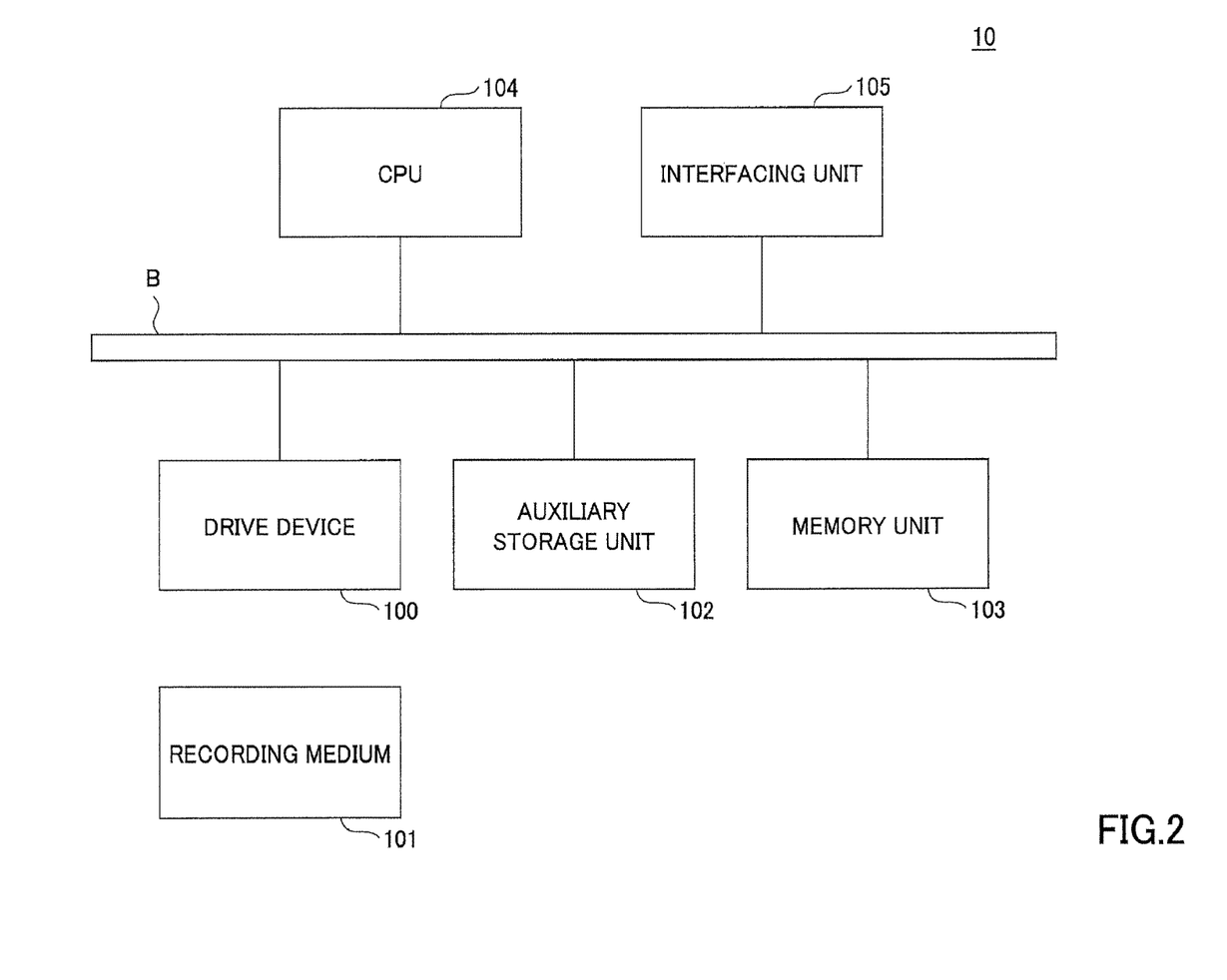
FIG. 2 is a diagram illustrating an example of a hardware configuration of a flow evaluation device in an embodiment of the present invention.

FIG. 2 is a diagram illustrating an example of a hardware configuration of the flow evaluation device in the embodiment of the present invention. The flow evaluation device 10 in FIG. 2 includes a drive device 100, an auxiliary storage unit 102, a memory unit 103, a CPU 104, and an interface unit 105, which are mutually connected by a bus B.

A program that implements processing on the flow evaluation device 10 is provided with a recording medium 101 such as a CD-ROM. When the recording medium 101 storing the program is set in the drive unit 100, the program is installed into the auxiliary storage unit 102 from the recording medium 101 via the drive unit 100. However, installation of the program is not necessarily executed from the recording medium 101, but may also be downloaded from another computer via the network. The auxiliary storage unit 102 stores the installed program, and stores required files, data, and the like as well.

Upon receiving a command to activate the program, the memory unit 103 reads the program from the auxiliary storage unit 102, to load the program. The CPU 104 executes functions relevant to the flow evaluation device 10 according to the program stored in the memory unit 103. The interface unit 105 is used as an interface for connecting to a network.

Figure 3:
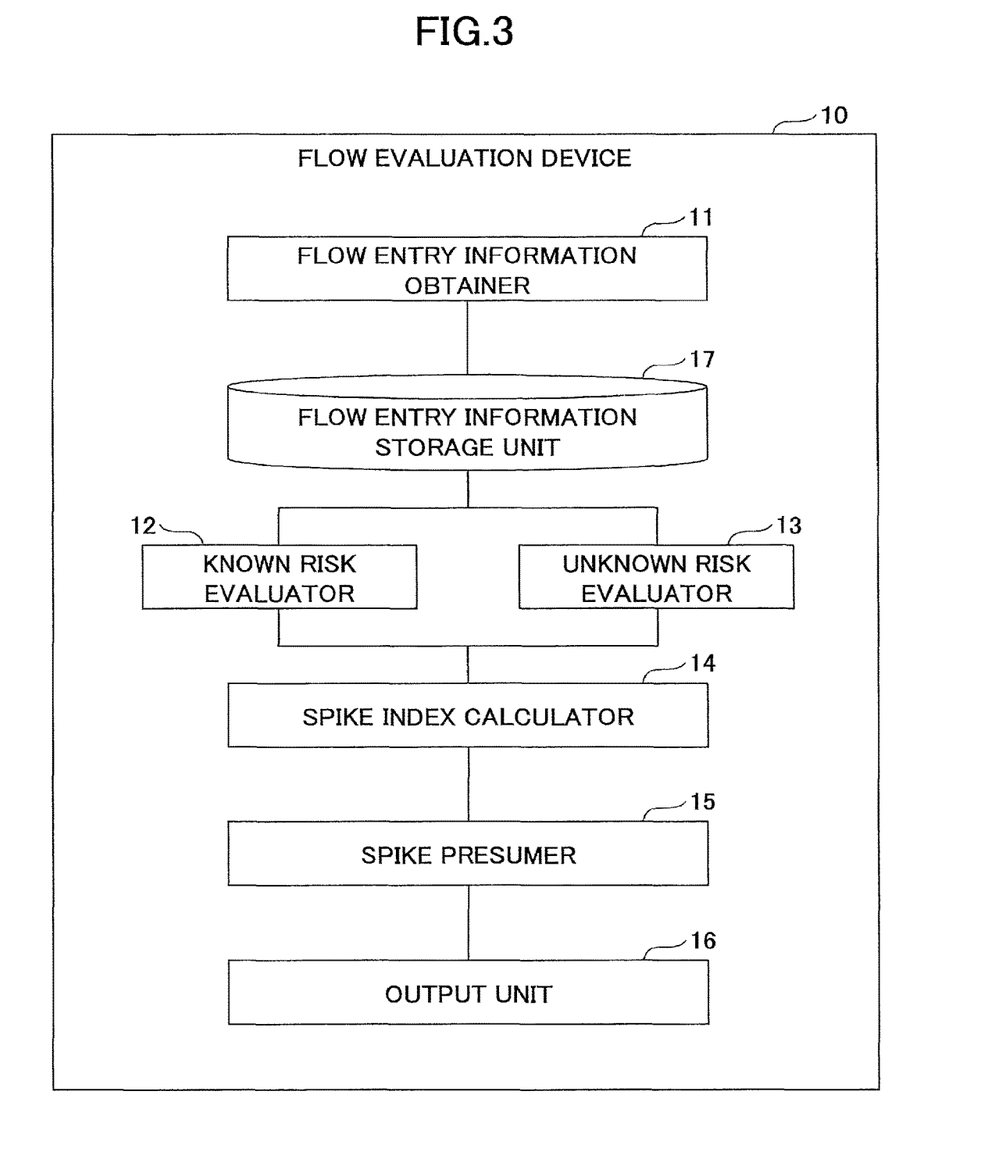
FIG. 3 is a diagram illustrating an example of a functional configuration of a flow evaluation device in an embodiment of the present invention.

FIG. 3 is a diagram illustrating an example of a functional configuration of the flow evaluation device according to the embodiment of the present invention. In FIG. 3, the flow evaluation device 10 includes a flow entry information obtainer 11, a known risk evaluator 12, an unknown risk evaluator 13, a spike index calculator 14, a spike presumer 15, and an output unit 16. These units are implemented by processes that one or more programs installed in the flow evaluation device 10 cause the CPU 104 to execute. The flow evaluation device 10 also uses a flow entry information storage unit 17. The flow entry information storage unit 17 can be implemented by using the auxiliary storage unit 102, a memory unit that can be connected to the flow evaluation device 10, or the like.

The flow entry information obtainer 11 obtains the flow identifier and the flow counter value of each flow entry of each transfer device 30 from the control device 20. The obtained flow identifier and flow counter value are stored in the flow entry information storage unit 17 for each flow entry.

The known risk evaluator 12 evaluates extent of variation of the amount of data (the amount of traffic), based on a history of the amount of data (the amount of traffic) that has matched the conditions of the flow entry, for each flow entry. More specifically, the known risk evaluator 12 evaluates, for each flow entry, a risk of a recurrence of a spike flow that has been observed in the past (referred to as a "known risk", below), based on patterns of the variation of traffic in the past, which are represented by time series of the amounts of traffic (the flow counter values) of each flow entry in the past. The evaluation result is processed in a predetermined way to obtain an evaluation value regarded as an indicator.

The unknown risk evaluator 13 evaluates, for each flow entry, the size of a space of the flow entry, based on the conditions of the flow entry. More specifically, the unknown risk evaluator 13 evaluates, based on a flow space represented by the flow identifier of each flow entry, a risk of an occurrence of an unknown spike flow (referred to as an "unknown risk", below) in the future. The evaluation result is processed in a predetermined way to obtain an evaluation value regarded as an indicator. Note that the flow space will be described in detail later.

The spike index calculator 14 calculates the spike index for each flow entry, based on the evaluation result by the known risk evaluator 12 and the evaluation result obtained by the unknown risk evaluator 13. Specifically, the spike index calculator 14 classifies spike flows that possibly occur in the future into two patterns: (1) known spike flows that have occurred in the past; and (2) unknown spike flows that have never occurred, to calculate the spike index by combining the risks of the two patterns (1) and (2).

The spike presumer 15 presumes a flow entry having a high possibility to be matched as a spike flow in the future, based on the spike index calculated for each flow entry by the spike index calculator 14.

The output unit 16 outputs a result presumed by the spike presumer 15. The output form is not limited to a predetermined one. For example, the output form may be displaying on a display such as a liquid crystal display, and may be outputting to a printer. Alternatively, for example, the output form may be transmitting an e-mail or the like via the network.

Figure 4:
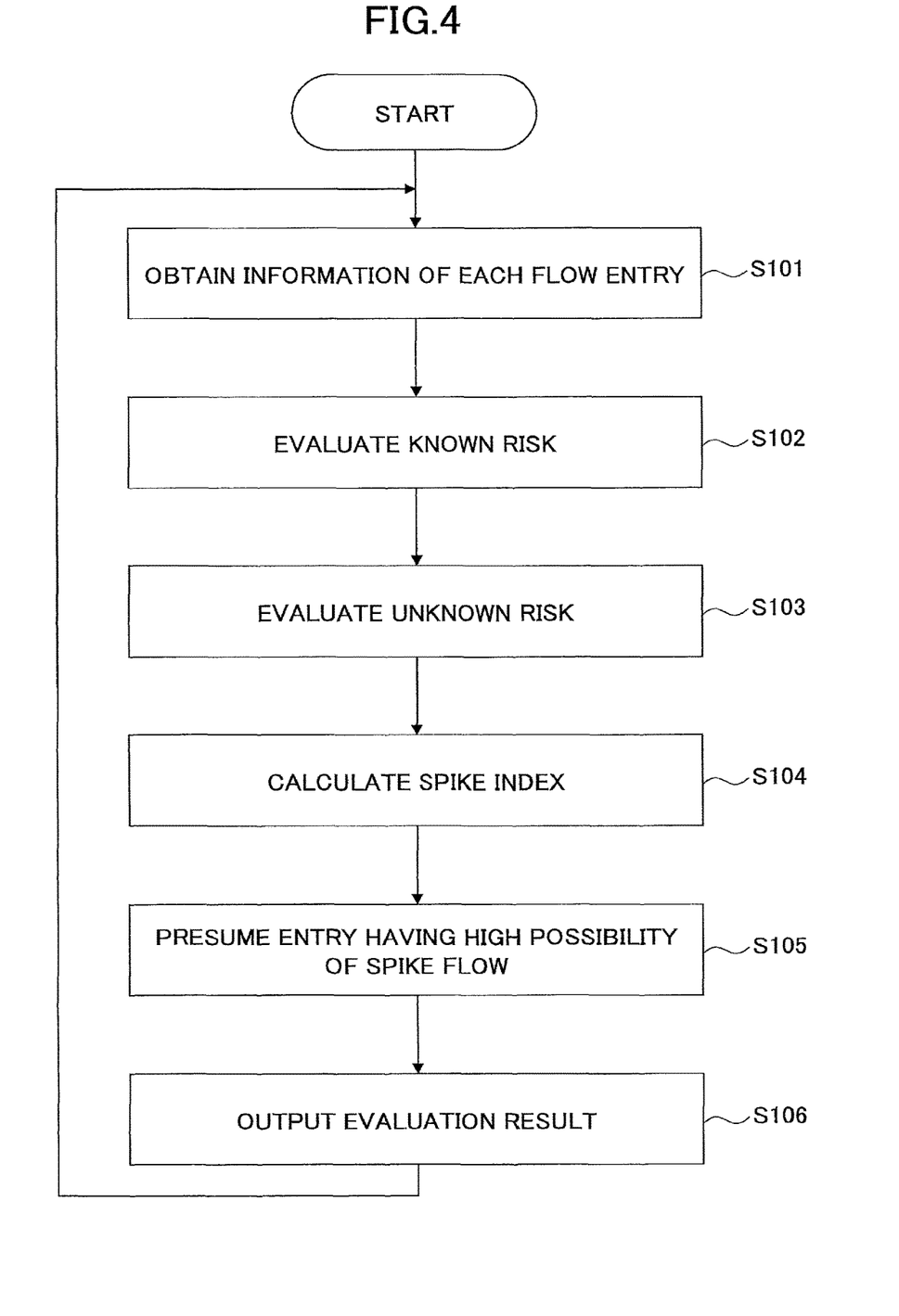
FIG. 4 is a flowchart illustrating an example of processing steps executed by a flow evaluation device.

In the following, processing steps executed by the flow evaluation device 10 will be described. FIG. 4 is a flowchart illustrating an example of processing steps executed by the flow evaluation device.

At Step S101, the flow entry information obtainer 11 obtains information including the flow identifier and the flow counter value of each flow entry of the flow table of each transfer device 30 (referred to as "flow entry information", below), which are collected by the control device 20 from each transfer device 30. The obtained flow entry information is stored in the flow entry information storage unit 17.

Figure 5:
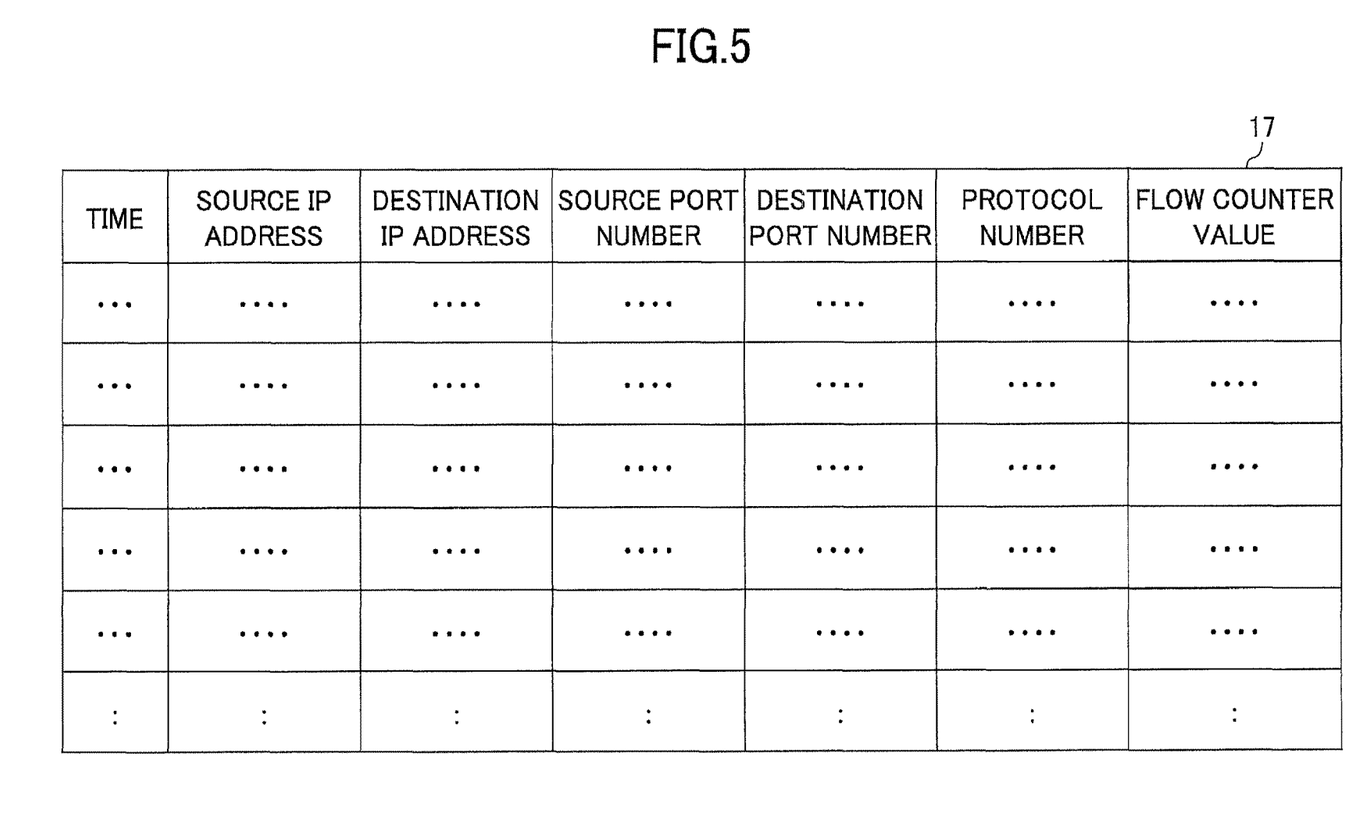
FIG. 5 is a diagram illustrating an example of a configuration of a flow entry information storage unit.

FIG. 5 is a diagram illustrating an example of a configuration of the flow entry information storage unit. FIG. 5 illustrates one of the flow entry information tables stored for respective flow entries in the flow entry information storage unit 17. In other words, the flow entry information table is stored in the flow entry information storage unit 17 for each flow entry of each transfer device 30.

Each record of the flow entry information table includes items of time, source IP address, destination IP address, source port number, destination port number, protocol number, and flow counter value. The time represents a time at which the control device 20 obtained the flow entry information relating to the record from the transfer device 30. Therefore, a record is stored in the flow entry information table every time the control device 20 obtains the flow entry information from each transfer device 30.

Items from the source IP address to the protocol number constitute a flow identifier. The flow counter value is a flow counter value at the time of the record.

Here, it is assumed that Step S101 is executed in the same cycle as the cycle of collecting the flow entry information by the control device 20. Therefore, at Step S101, one record is added into each flow entry information table, which corresponds to the flow entries for each transfer device 30.

Then, the known risk evaluator 12 evaluates a known risk with reference to the flow entry information storage unit 17 (Step S102). The known risk evaluator 12 evaluates a known risk, based on the frequency (rate) of spike flows generated in the variation of the amount of traffic in the past, or based on a coefficient of variation representing the variation of the amount of traffic in the past. The former is estimated by a 5-σ method. The latter is estimated by a CV (Coefficient of variation) method.

In the 5-σ method, the standard deviation of the amount of traffic is used as a threshold. Specifically, the method calculates the standard deviation σ of the amount of traffic during a certain period in the past, and evaluates the extent of the variation of the amount of traffic during the certain period, based on comparison between the standard deviation a and the amount of traffic at each time included in the certain period. For example, among the times included in the certain period, the frequency of times when the amount of traffic is greater than or equal to five σ, is used as an evaluation value of the known risk. Note that five σ as the threshold is simply an example. The threshold may be three a or may be any other value based on σ.

The standard deviation σ can be calculated by the following Formula (1).

$$\sigma = \sqrt{\frac{1}{N}\sum_{n=1}^{N}\left(y(t_n) - \frac{1}{N}\sum_{n=1}^{N}y(t_n)\right)^2} \quad (1)$$

where $y_i(t_n)$ represents the amount of traffic at time $t_n$ of a flow entry i. The amount of traffic at time $t_n$ is a value obtained by subtracting the flow counter value at time $t_{n-1}$ from the flow counter value at time $t_n$. Note that n represents the sequence number for each time in time series. Also, the value of N represents, for example, the total number of the times included in the evaluation period (the number of records in the flow entry information table). The evaluation period may be set, for example, in advance. In the embodiment, the value of N is assumed to be 20.

In the 5-σ method, the known risk evaluator 12 calculates the standard deviation σ for the latest 20 records (20 records from the last) for each flow entry information table (i.e., for each flow entry). The known risk evaluator 12 counts the number of records (i.e., the number of times) whose flow counter value is greater than or equal to five n among the 20 records. The count result of the number of the records is the evaluation value of the known risk by the 5-σ method in the latest evaluation period. Note that the length of the evaluation period is set to a fixed interval that is the same for every repetition of Steps S101 and after. Therefore, the number of the times in each evaluation period at which the flow counter value is greater than or equal to five σ substantially represents the ratio of the period of time during which the flow counter value is greater than or equal to five σ, to the evaluation period. Note that if the evaluation period is not fixed, a value obtained by dividing the number of the times in each evaluation period at which the flow counter value is greater than or equal to five σ, by the number of the times included the evaluation period, may be regarded as the evaluation value of the known risk by the 5-σ method.

On the other hand, in the CV method, the coefficient of variation CV of the patterns of the variation of traffic is used as an evaluation value. The coefficient of variation CV is calculated, for example, by the following Formula (2).

$$CV = \frac{\sqrt{\frac{1}{N}\sum_{n=1}^{N}\left(y(t_n) - \frac{1}{N}\sum_{n=1}^{N}y(t_n)\right)^2}}{\frac{1}{N}\sum_{n=1}^{N}y(t_n)} \quad (2)$$

where the meaning of each variable is the same as in Formula (1). In other words, the coefficient of variation CV is a value obtained by dividing the standard deviation σ by an average (the arithmetic average).

In the CV method, the known risk evaluator 12 calculates the coefficient of variation CV for the latest 20 records for each flow entry information table (i.e., for each flow entry).

Note that at Step S102, either of the 5-σ method or the CV method may be used. Also, for example, the standard deviation σ may be regarded as the evaluation value of the known risk. Another evaluation value may be used as long as patterns of the variation of traffic can be evaluated based on the value.

Next, the unknown risk evaluator 13 evaluates the unknown risk for each flow entry, based on the size of the flow space represented by the flow identifier of each flow entry (S103). Specifically, the size of the flow space is regarded as the evaluation value of the unknown risk. As an evaluation method of the size of the flow space, for example, a dimension method or a bit method is used.

In the dimension method, the number of unspecified dimensions in the flow identifier is regarded as the evaluation value of the size of the flow space (i.e., the evaluation value of the unknown risk). An unspecified dimension means a dimension (an item) in a flow identifier whose value is not specified. For example, assume that the flow identifier consists of five dimensions, being source IP address, destination IP address, source port number, destination port number, and protocol number. In this case, if the flow identifier has values specified only for the destination IP address and the protocol number, the number of unspecified dimensions of the flow identifier is three. Therefore, in this case, the evaluation value of the unknown risk is 3.

Based on the dimension method, the unknown risk evaluator 13 counts, for example, the number of the items (dimensions) whose values are not specified among the source IP address, the destination IP address, the source port number, the destination port number, and the protocol number in the latest record (i.e., the record recording the flow entry information obtained at Step S101) for each flow entry information table (i.e., each flow entry). This count result is the number of unspecified dimensions, and represents the evaluation value of the unknown risk by the dimension method.

On the other hand, in the bit method, the number of unspecified bits in the flow identifier is regarded as the evaluation value of the size of the flow space (i.e., the evaluation value of the unknown risk). The unspecified bits are bits in the flow identifier to which a wildcard and/or a network mask are applied. In other words, the number of unspecified bits is the number of bits of a part of the flow identifier where the values are not determined. For example, assume that the flow identifier is represented by 104 bits in total, consisting of source IP address (32 bits)+destination IP address (32 bits)+source port number (16 bits)+destination port number (16 bits)+protocol number (8 bits). In this case, if values (values not including a wildcard) are specified only for the destination IP address and the destination port number, and the values are not specified or wildcards are specified for the other items, the number of unspecified bits is 56 bits. Also, there are cases in which a wildcard is specified as a value for a part of an item. In such a case, the numbers of bits of the part are added to the number of unspecified bits.

Based on the bit method, the unknown risk evaluator 13 counts, for example, the number of bits of parts at which values are not specified or replaced by wildcards or the like among the source IP address, the destination IP address, the source port number, the destination port number, and the protocol number in the latest record for each flow entry information table (i.e., each flow entry). This count result is the number of unspecified bits, and represents the evaluation value of the unknown risk by the bit method.

Note that either of the dimension method or the bit method may be used. Also, the ratio of the number of unspecified dimensions in the dimension method, or the ratio of the number of unspecified bits in the bit method, may be regarded as the evaluation value of the unknown risk. In the embodiment, basically, since the number of the dimensions and the total number of the bits of the flow identifier are fixed, the number of unspecified dimensions and the number of unspecified bits substantially correspond to the ratio of the number of the unspecified dimensions, or the ratio of the number of the unspecified bits.

Next, the spike index calculator 14 calculates a spike index SI of each flow entry based on the following Formulas (3) (Step S104).

$$SI_i = \alpha E(Y_i) + \beta U(f_i) \quad (3)$$

where the meaning of each variable is as follows.

$SI_i$: spike index of a flow entry i
$Y_i = (y_i(t_1), y_i(t_2) \ldots, y_i(t_N))^T$: amounts of traffic of the flow entry i (flow counter values)
$y_i(t)$: amount of traffic of the flow entry i at time t (flow counter value)
$f_i$: flow space represented by the flow identifier of the flow entry i
$\alpha$: weight coefficient with respect to the known risk
$\beta$: weight coefficient with respect to the unknown risk
$E(Y_i)$: evaluation value of the known risk
$U(f_i)$: evaluation value of the unknown risk In other words, the spike index calculator 14 substitutes, for each flow entry, the evaluation value of the known risk obtained at Step S102 for $E(Y_i)$ in Formula (3), and substitutes the evaluation value of the unknown risk obtained at Step S103 for $U(f_i)$ of Formula (3), to calculate the spike index of the flow entry. Note that the weight coefficients $\alpha$ and $\beta$ may be selected depending on the evaluation methods of the known risk and the unknown risk. For example, as for the known risk, the value of $\alpha$ for the 5-$\sigma$ method and the value of $\alpha$ for the CV method may be set in advance, and the value of $\alpha$ may be selected depending on which evaluation method has been used. Similarly, as for the unknown risk, the value of $\beta$ for the dimension method and the value of $\beta$ for the bit method may be set in advance, and the value of $\beta$ may be selected depending on which evaluation method has been used. Such selection can decrease the variation of the spike index caused by the difference between the evaluation methods of the known risk, and the variation of the spike index caused by the difference between the evaluation methods of the unknown risk, thereby the threshold for the spike index can be set constant.

Next, the spike presumer 15 evaluates the spike index calculated at Step S104 for each flow entry of each transfer device 30, to presume a flow entry having a high possibility to be matched as a spike flow in the future (a high possibility of causing a spike flow) among the flow entries (Step S105). For example, the spike index of each flow entry may be compared with the threshold, to presume a flow entry having a high possibility to be matched as a spike flow in the future. In other words, a flow entry whose spike index is greater than or equal to the threshold may be presumed as a flow entry having a high possibility to be matched as a spike flow in the future. In this case, the threshold may be set for each combination of the evaluation methods of the known risk and the evaluation methods of the unknown risk. In the embodiment, since the two evaluation methods of the known risk are available and the two evaluation methods of the unknown risk are available, four thresholds (2×2=4) may be set. However, based on the coefficients $\alpha$ and $\beta$, if the variation in the spike variable caused by difference between the evaluation methods is limited, only one threshold may be set.

Next, the output unit 16 outputs the result presumed by the spike presumer 15 at Step S105 (Step S106). For example, the identification information of a flow entry having a possibility to be matched as a spike flow may be output if the possibility is greater than or equal to the threshold. Alternatively, the output unit 16 may output the spike index of each flow entry calculated at Step S104.

Next, Steps S101 and after are repeated. Note that the flow evaluation device 10 may generate a prototype of the flow table of each transfer device 30, based on the spike index of each flow entry. In this case, flow data (traffic information) is collected from each transfer device 30 so as to be accumulated in the flow evaluation device 10. The flow data may be collected by the technology of NetFlow or the like. The flow data includes flow header information (5-tuple), time, and the number of bytes. The flow data is collected at each time, to form a database of the past flow data. The flow evaluation device 10 may calculate, for each flow entry constituting the newly generated prototype of the flow table, the spike index by using information of the past flow data in the database and the flow space information of the flow entry, to evaluate a risk that a spike flow may occur, with respect to the prototype of the flow table. The flow evaluation device 10 may repeatedly generate prototypes of the flow table (generated through trial and error), to eventually generate a flow table such that a spike flow may not concentrate on a specific flow entry, or to eventually generate a flow table such that a spike flow concentrates on a specific flow entry whereby individual control can be applied more easily.

Note that although the example has been described in which the spike index is calculated in real time, calculation of the spike index may be executed, for example, in batch mode. In this case, for each flow entry information table stored in the flow entry information storage unit 17 for each flow entry, a record obtained at a certain time is set as a record to be processed, and Steps S101 and after are executed. Then, Steps S101 and after may be repeated while the record to be processed is shifted to a record obtained at the next time. In this case, at Step S102, the evaluation value of the known risk is calculated based on the latest 20 records processed in this way.

As described above, according to the embodiment, the spike index is calculated based on the known risk and the unknown risk. Therefore, it is possible to evaluate a possibility of a sudden occurrence of a flow whose traffic volume is large, taking into consideration not only a known spike flow, but also the risk of an unknown spike flow. Also, the spike index is calculated for each flow entry. Therefore, for example, a network administrator can reduce an influence of congestion of the network for cases in which a spike flow occurs, by applying traffic shaping and detour control in advance to traffic that matches a flow entry having a high spike index.

Note that in the embodiment, the known risk evaluator 12 is an example of a first evaluator. The unknown risk evaluator 13 is an example of a second evaluator. The spike index calculator 14 is an example of a calculator. The flow entry is an example of a record used for transmission control of data circulating in a network. In other words, the embodiment may also be applied to a record for controlling data transfer used in a transfer device corresponding to a protocol other than OpenFlow.

As above, the embodiments of the present invention have been described in detail. Note that the present invention is not limited to such specific embodiments, but various variations and modifications may be made within the scope of the subject matters of the present invention described in the claims.

The present patent application claims priority based on Japanese Patent Application No. 2015-018659, filed on Feb. 2, 2015, and the entire contents of the Japanese Patent Application are incorporated herein by reference.

LIST OF REFERENCE SYMBOLS 10 flow evaluation device
11 flow entry information obtainer
12 known risk evaluator
13 unknown risk evaluator
14 spike index calculator
15 spike estimator
16 output unit
17 flow entry information storage unit
20 control device
30 transfer device
40 edge node
100 drive device
101 recording medium
102 auxiliary storage unit
103 memory device
104 CPU
105 interface unit
B bus

The invention claimed is:

1. An evaluation device, comprising: a communication interface configured to communicate with a control device which is connected to a network that includes at least one transfer device and to receive, from the control device, records used for transmission control of data currently circulating in the network: and
processing circuitry configured to implement
a first evaluator configured, for each of the records, to evaluate extent of variation of an amount of the data, based on a history of the amounts of the data matching a condition of the record;
a second evaluator configured, for each of the records, to evaluate a size of a space represented by the record, based on the condition of the record; and
a calculator configured, for each of the records, to calculate an index value representing a possibility that the respective record corresponds to a future spike flow at a future time when a predetermined or a greater amount of the data matches the condition of the record within a fixed period of time, based on an evaluation result by the first evaluator, and an evaluation result by the second evaluator,
wherein the processing circuitry is configured to control an output of an indication of a possibility that one of the records corresponds to a future spike flow based on the calculated index values for each of the records.

2. The evaluation device as claimed in claim 1, wherein the first evaluator calculates a standard deviation for the history of the amounts of the data, to evaluate the extent of the variation, based on comparing each of the amounts of the data constituting the history with the standard deviation.

3. The evaluation device as claimed in claim 1, wherein the first evaluator calculates a standard deviation and an average for the history of the amounts of the data, to evaluate the extent of the variation, based on a value obtained by dividing the standard deviation by the average.

4. The evaluation device as claimed in claim 1, wherein the second evaluator evaluates the size of the space, based on a number of items whose values are not specified, among the items constituting the condition.

5. The evaluation device as claimed in claim 1, wherein the second evaluator evaluates the size of the space, based on a number of bits whose values are not determined, among the bits constituting the condition.

6. An evaluation method executed by a computer, the method comprising:
communicating with a control device which is connected to a network that includes at least one transfer device and receiving, from the control device, records used for transmission control of data currently circulating in the network:
a first evaluation step, for each of the records, evaluating extent of variation of an amount of the data, based on a history of the amounts of the data matching a condition of the record;
a second evaluation step, for each of the records, evaluating a size of a space represented by the record, based on the condition of the record; and
a calculation step, for each of the records, calculating an index value representing a possibility that the respective record corresponds to a future spike flow at a future time when a predetermined or a greater amount of the data matches the condition of the record within a fixed period of time, based on an evaluation result by the first evaluation step, and an evaluation result by the second evaluation step; and
controlling an output of an indication of a possibility that one of the records corresponds to a future spike flow based on the calculated index values for each of the records.

7. A non-transitory computer-readable recording medium having a program stored therein for causing a computer to execute a method, the method comprising:
communicating with a control device which is connected to a network that includes at least one transfer device and receiving, from the control device, records used for transmission control of data currently circulating in the network:

a first evaluation step, for each of the records, evaluating extent of variation of an amount of the data, based on a history of the amounts of the data matching a condition of the record;

a second evaluation step, for each of the records, evaluating a size of a space represented by the record, based on the condition of the record; and a calculation step, for each of the records, calculating an index value representing a possibility that the respective record corresponds to a future spike flow at a future time when a predetermined or a greater amount of the data matches the condition of the record within a fixed period of time, based on an evaluation result by the first evaluation step, and an evaluation result by the second evaluation step; and controlling output of an indication of a possibility that one of the records corresponds to a future spike flow based on the calculated index values for each of the records.

\* \* \* \* \*